United States Patent [19]
Oudet et al.

[11] Patent Number: 5,334,893
[45] Date of Patent: Aug. 2, 1994

[54] MONOPHASE ELECTROMAGNETIC ROTARY ACTUATOR OF TRAVEL BETWEEN 60 AND 120 DEGREES

[75] Inventors: Claude Oudet, Besancon; Daniel Prudham, Thise, both of France

[73] Assignee: Moving Magnet Technologies SA, Besancon, France

[21] Appl. No.: 22,916

[22] Filed: Feb. 26, 1993

[30] Foreign Application Priority Data

Feb. 28, 1992 [FR] France ............... 92 02435

[51] Int. Cl.$^5$ ............................................. H02K 33/00
[52] U.S. Cl. ................................. 310/38; 310/36
[58] Field of Search ................ 310/36, 15, 17, 37, 310/38, 39; 318/122, 123, 124

[56] References Cited
U.S. PATENT DOCUMENTS 4,177,395 12/1979 Hore ........................... 310/39
4,482,847 11/1984 Rudich, Jr. et al. .......... 318/9
4,889,002 12/1989 Abraham ................... 74/89.15

Primary Examiner—Emanuel T. Voeltz
Assistant Examiner—Judson H. Jones
Attorney, Agent, or Firm—Oblon, Spivak, McClelland, Maier & Neustadt

[57] ABSTRACT

This invention relates to a monophase electromagnetic rotary actuator of angular travel between 70/N and 110/N degrees exhibiting a high torque/mass ratio and a torque that is approximately independent of the angular position of the rotor. A relation between the magnetized width $Y_a$ measured on the mean diameter of the magnets, the width of the angular arc C through which the rotor passes on the mean diameter of the magnets, the width S measured on the mean diameter of the magnets between two adjacent stator poles, the radial length of the magnets L, and the constant length E of the air gap is:

$$Y_a = C + S + 2 E'$$

where $E'$ is between $E/2$ and $E$. Furthermore, $C+2 E'/E > 6$ and $L/E > 0.75$.

12 Claims, 7 Drawing Sheets

MONOPHASE ELECTROMAGNETIC ROTARY ACTUATOR OF TRAVEL BETWEEN 60 AND 120 DEGREES

BACKGROUND OF THE INVENTION

1. Field of the Invention

This invention relates to a monophase electromagnetic rotary actuator which may find particular application in controlling valves.

2. Discussion of the Background

Actuators having a rotor and a stator structure have, in particular, been described in French patent No. 89.08.052 of the applicant. These actuators are optimized for considerable travels, close to the limit, which in theory is 180 degrees for actuators having two poles and in practice is on the order of 120 degrees, and for actuators having four poles, 90 degrees in theory and on the order of 60 degrees in practice.

For applications requiring travels between 60 degrees and 120 degrees, and a considerable torque, previously known actuators, however, exhibit several drawbacks, in particular because of their weight and their bulk.

In particular, for certain applications, a person skilled in the art selects hybrid-type stepper motors and not the monophase motors of the prior art. Such motors are of a biphase type and generally have about fifty poles. These motors exhibit an advantage of a high torque/mass ratio. On the other hand, these motors require complex control electronics, which increases their overall cost and reduces their reliability. Furthermore, the functional air gaps for these stepper motors, are less than a tenth of a millimeter, which involves very reduced assembly and production tolerances, and puts a strain on the price and reliability of such actuators.

SUMMARY OF THE INVENTION

Accordingly, one object of the present invention is to provide a novel actuator which overcomes these drawbacks by proposing an efficient actuator that can be controlled by a monophase electronic control circuit which is less complex than biphase control circuits required for stepper motors. The actuator of the present invention is of a simple and sturdy design which makes possible rapid angular movements and that exhibits a torque/mass ratio at least as high as that of hybrid motors, i.e., on the order of 1.5 Newton-meters per kilogram for actuators of peak-torque on the order of a Newton.

To achieve these objectives, the present invention is directed more particularly to a monophase electromagnetic rotary actuator with angular travel between 70/N degrees and 110/N degrees, preferably between 80/N degrees and 100/N degrees of the type comprising a rotor exhibiting 2N magnets, N being equal to 1 or to 2, and a core of a material of high magnetic permeability. Further, a stator having at least one coil and exhibiting two pole pieces joined by at least one connecting part is also provided, the pole pieces on the one hand and the core of the rotor on the other hand defining between them an air gap of constant length E and extending over 2N arcs $Y_a$.

The relation between the magnetized width of each pole of magnets $Y_a$ measured at the mean diameter of the magnets, the width of the angular arc C through which the rotor passes on the mean diameter of the magnets, the width S measured on the mean diameter of the magnets between the two consecutive stator poles, and the constant length E of the air gap is $$Y_a = C + S + 2 E'$$

where $E'$ is between $E/2$ and $E$.

In addition, $C + 2 E'/E > 6$ and $L/E > 0.75$, preferably $0.8 < L/E < 0.9$, L designating the length of the magnet in the direction of the magnetization.

These structural relations make it possible to provide a constant torque at constant current over almost the entire travel of the rotor, and to guarantee a detent torque in the absence of very low, even zero current. Considering the required travel, between 70/N degrees and 110/N degrees, this relation can be verified by providing either an angular opening of each of the stator poles clearly less than 180/N degrees, associated with an angular opening of each magnet pole slightly less than 180/N degrees, or an angular opening of each of the magnet poles clearly less than 180/N degrees, associated with an angular opening of each stator pole slightly less than 180/N degrees.

In both cases, the angular width of the magnet located in the air gap is between 80/N degrees and 120/N degrees.

By "clearly less", "less by at least 50/N degrees" is meant and by "approximately less", "less by fewer than 10 degrees" is meant.

The torque obtained with actuators according to the present invention is approximately equal to $$N \cdot D_m \cdot B_r \cdot \frac{L}{E} \cdot Z \cdot n \cdot I, \text{ where:}$$

N designates the number of pairs of poles;
$D_m$ designates the mean diameter of the magnet;
$B_r$ designates the remanent flux density of the magnets;
nI designates the number of ampere-turns applied to the coil or coils;
L designates the length of the magnets in the direction of the magnetization;
E designates the length of the air gap;
Z designates the size of the magnet, measured in a direction perpendicular to the magnetization and to the direction of displacement, i.e., in an axial (height) direction in the case of a structure having semi-tubular tile-magnets, or in a radial direction for a structure having disk-magnets.

According to a first embodiment of the present invention, the monophase electromagnetic rotary actuator according to the present invention exhibits magnets whose magnetization is approximately radial, in the form of cylindrical tiles, with a peripheral width $Y_a$ measured on the mean diameter of the magnets. The stator part has 2N pole pieces cooperating with the magnets, connected by a U-shaped connecting part. The excitation coil is supported by this U-shaped connecting part. A variant comprises providing two coils each surrounding one of the stator poles.

According to a second embodiment of the present invention, the magnets of the rotor are in the shape of disk sectors magnetized transversely, the stator part having 2N pole pieces cooperating with the magnet, connected by a U-shaped connecting part supporting the excitation coil. A variant comprises providing two coils each surrounding one of the stator poles.

According to a third embodiment of the present invention, the median section plane of the U-shaped connecting part is perpendicular to the axis of rotation of the rotor.

According to another variant of the present invention, the median section plane of the U-shaped connecting part is parallel to a plane of symmetry of each of the pole pieces and containing the axis of rotation of the rotor.

According to another particular variant of the present invention, the pole pieces of the stator are joined by two diametrically opposite connecting parts, each carrying an excitation coil. A further variant comprises providing two coils each surrounding one of the stator poles.

According to a first preferred embodiment of the present invention, the width S measured on the mean diameter of the magnets between two consecutive stator poles is approximately equal to length E of the air gap. The width of arc $Y_a$ of each of the poles of the magnet is:

$$Y_a = C + 2E + S \approx C + 3E,$$

and the two magnets extend over arcs between 80°/N and 130°/N.

According to another advantageous embodiment of the present invention, the width of arc $Y_s$ of a stator pole measured on the mean diameter of the magnets is equal to:

$$Y_s = C + 2E + T \approx C + 3E,$$

where T designates the transition zone between the two magnets of the rotor, the stator poles extending over arcs between 80°/N and 130°/N.

Preferably, the ratio L/E, where L designates the length in the direction of the magnetization of the magnets, is greater than 0.8, to obtain a high mean operating point in the second quadrant of curve B(H), so that the excitation of the stator parts can cause the operating point to vary with a considerable excursion between 0 Tesla and the maximum induction corresponding to a value for which the permeability of the iron is low, i.e., about 1.7 Teslas.

Advantageously, the section of the stator connecting part perpendicular to the field lines is approximately equal to C×Z, where:

C designates the travel of the rotor measured on the mean diameter of the magnets; and Z designates the height of the magnets, measured according to a dimension perpendicular to the displacement and to the direction of magnetization.

According to a particular variant embodiment of the present invention, the stator structure comprises two parallel packets of laminations, the packets being assembled perpendicularly, where the first of the lamination packets defines the stator pole pieces comprising laminations placed perpendicularly to the axis of rotation. The second lamination packet defines the U-shaped connecting part and comprises laminations parallel to a plane of symmetry of the stator containing the axis of rotation of the rotor. The laminations exhibit cutouts for the relative fitting and positioning of said lamination packets.

Advantageously, the first lamination packet defining the pole pieces comprises two series of pole laminations with a shape that is symmetrical in relation to the median plane of the actuator and has at each end a single lamination corresponding to the pole laminations joined by 2N saturable isthmuses.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
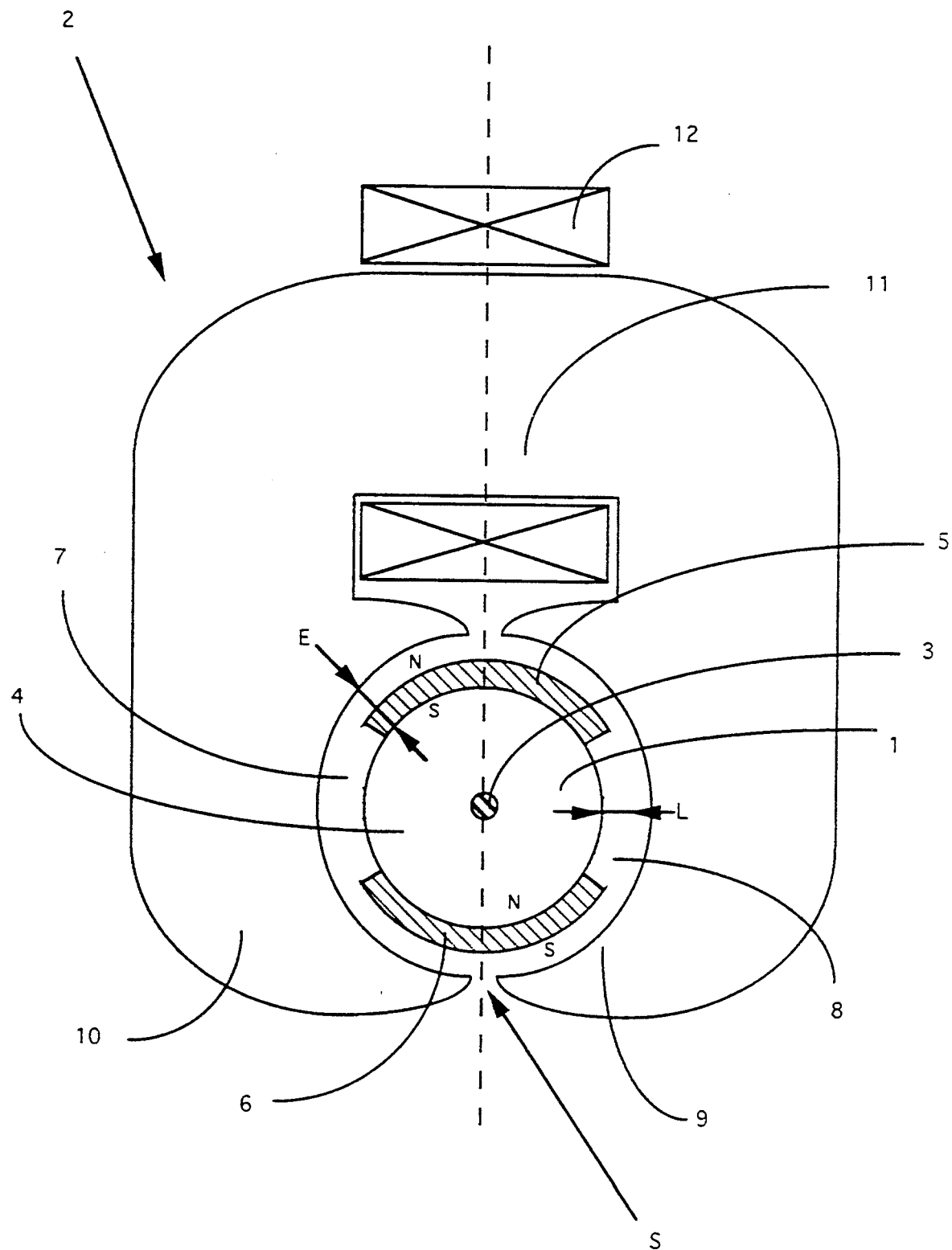
FIG. 1 represents a view in cross-section of a first embodiment of an actuator according to the present invention.
Figure 2:
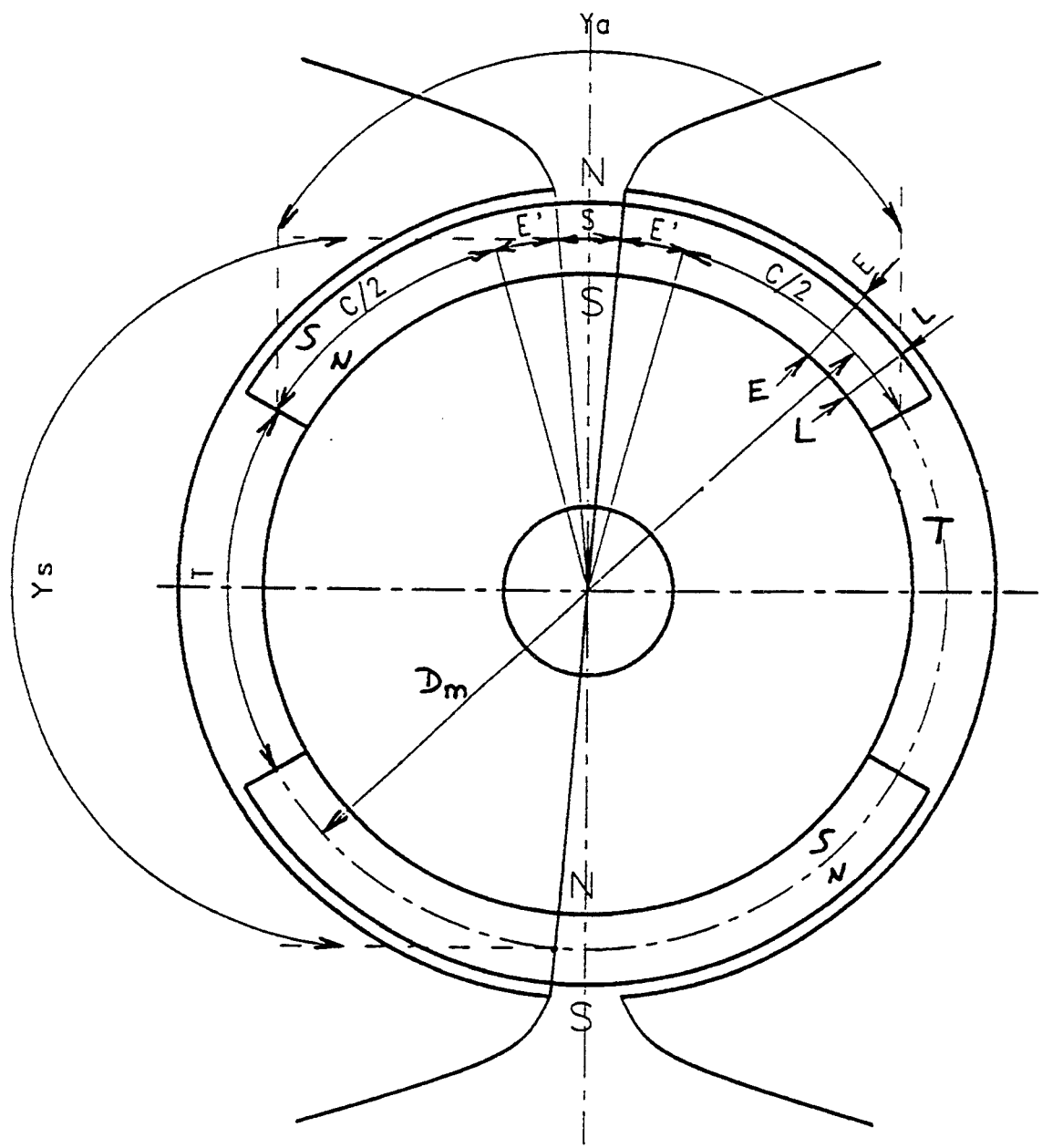
FIG. 2 represents a diagrammatic view of the actuator of FIG. 1.

Referring now to the drawings, wherein like reference numerals designate identical or corresponding parts throughout the several views, and more particularly to FIGS. 1 and 2 thereof, which represent a view in section of a first embodiment of an actuator according to the present invention.

The actuator according to this embodiment shown in FIGS. 1 and 2 exhibits a rotor 1 and a stator 2. Rotor 1 is mobile in rotation around a shaft 3. The rotor 1 comprises a soft iron cylindrical core 4 supporting two magnets 5 and 6. These two magnets 5 and 6 are in the shape of tiles, i.e., of a thin cylindrical section. Magnets 5 and 6 are magnetized radially, in the opposite direction, and are joined with the soft iron core 4 by gluing or by banding.

Each of magnets 5 and 6 extend over a cylindrical arc of about 120/N degrees, where N is an integer. In the case shown in FIG. 1, N=1, and the magnets extend over about 120 degrees. Magnets 5 and 6 are not contiguous, but keep between them, on both sides, cylindrical gaps 7 and 8, each gap 7 and 8 extending over an arc of about 60 degrees. The radial thickness L of the magnets is on the order of 2.5 millimeters. The height of the magnets 5 and 6 of the rotor is about 25 millimeters.

Stator 2 exhibits two pole pieces 9 and 10 connected by a stator connecting part 11 supporting coil 12. It comprises a stack of laminations of soft iron, or of iron-silicon, perpendicular to shaft 3 of the rotor. Core 4 of the rotor and stator poles 9 and 10 determine between them an air gap with a radial length E, occupied partially by magnets 5 and 6.

In the example described, the radial length of the air gap is 3 millimeters. In this embodiment described in FIGS. 1 and 2, pole pieces 9 and 10 are very enclosing, and the ends are separated by two slots of a width S, measured on the mean diameter of the magnets. In the example described, width S of the slot is about equal to 2 millimeters.

In the example described, mean diameter D of the magnets is 28 millimeters and width $Y_a$ of the magnetized zone is $120/360 \times \pi \times D_b = 29.3$ millimeters.

The travel, under conditions of zero detent torque in the absence of current is about equal to $Y_a - 2E' - S$, or 22 millimeters, which corresponds to an amplitude of rotation of about 90 degrees. The limitations of the travel are performed by any known means, for example, stops.

FIG. 2 represents a diagrammatic view of the actuator, indicating the various dimensions. FIG. 2 shows an example of an embodiment with wide stator poles, and therefore with a narrow slot S, cooperating with tile magnets that extend over clearly less than 180/N degrees. The rotor is represented at mid-travel, in an intermediate angular position.

In the embodiment shown in FIG. 2, the rotor is mobile ±45 degrees in relation to the position represented. All the dimensions C/2, E', S, T, $Y_s$ and $Y_a$ are measured on a circle whose diameter corresponds to the mean diameter $D_m$ taken in the middle of the thickness of the thin magnets 5 and 6.

Figure 3:
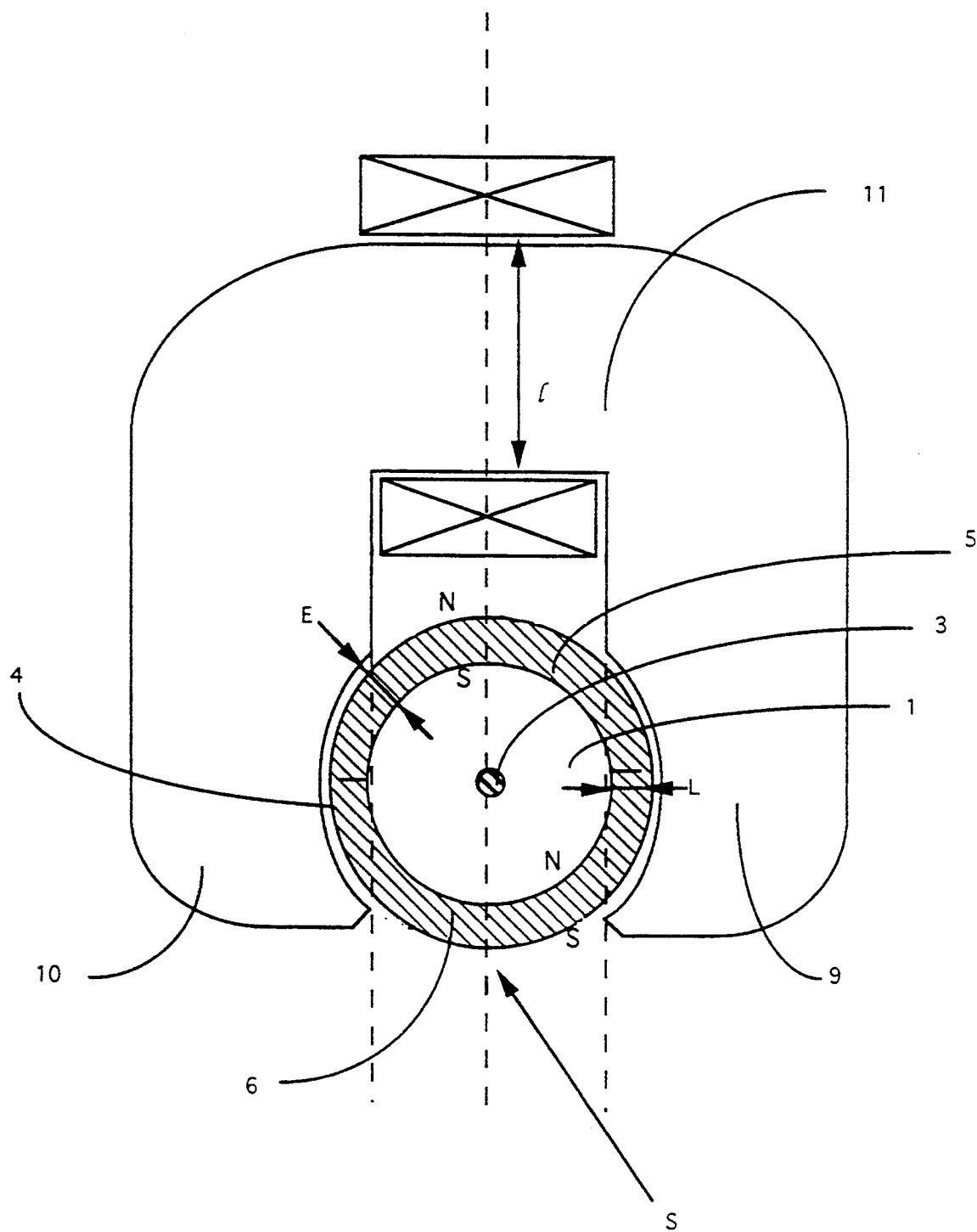
FIG. 3 represents a view in cross-section of a second embodiment of an actuator according to the present invention.

In the example described in FIG. 3, the actuator has two magnets 5 and 6 that meet and that each extend over 180/N degrees. Pole pieces 9 and 10 of the stator are less enclosing, and their ends are separated by a slot S, clearly wider than in the embodiment described in FIG. 1.

According to a variant embodiment, magnets 5 and 6 can be made in the shape of a single ring, of a material of the "MQII" type (a commercial name of material marketed by the General Motors Company) made in a pure, isotropic metal structure. This material is magnetized along cylindrical sections close to 180/N degrees.

In the embodiment described in FIG. 3, the dimensions of the various components of the actuator are as follows:

the mean diameter of the magnets is:

$D_m = 28$ millimeters;

the angular travel of the rotor is 90 degrees, hence:

$C = 90/360 \times D_m \times = 22$ millimeters;

the radial length of the air gap E is 3 millimeters;
the radial length L of the magnets is 2.5 millimeters;
the width S of the slot is 2.4 millimeters;
the height H of the magnets 15, 16 is 25 millimeters;
the width 1 of the connecting part 11 is 25 millimeters.

In such an actuator, the ampere-turns applied to the coil or coils can reach a value close to $$\frac{B_r \cdot L}{\mu_0 \cdot \mu_r}$$

where:
$B_r$ designates the remanent flux density;
L designates the radial length of the magnets;
$\mu_0$ designates the permeability of the vacuum;
$\mu_r$ designates the reversible permeability of the magnets.

Figure 4:
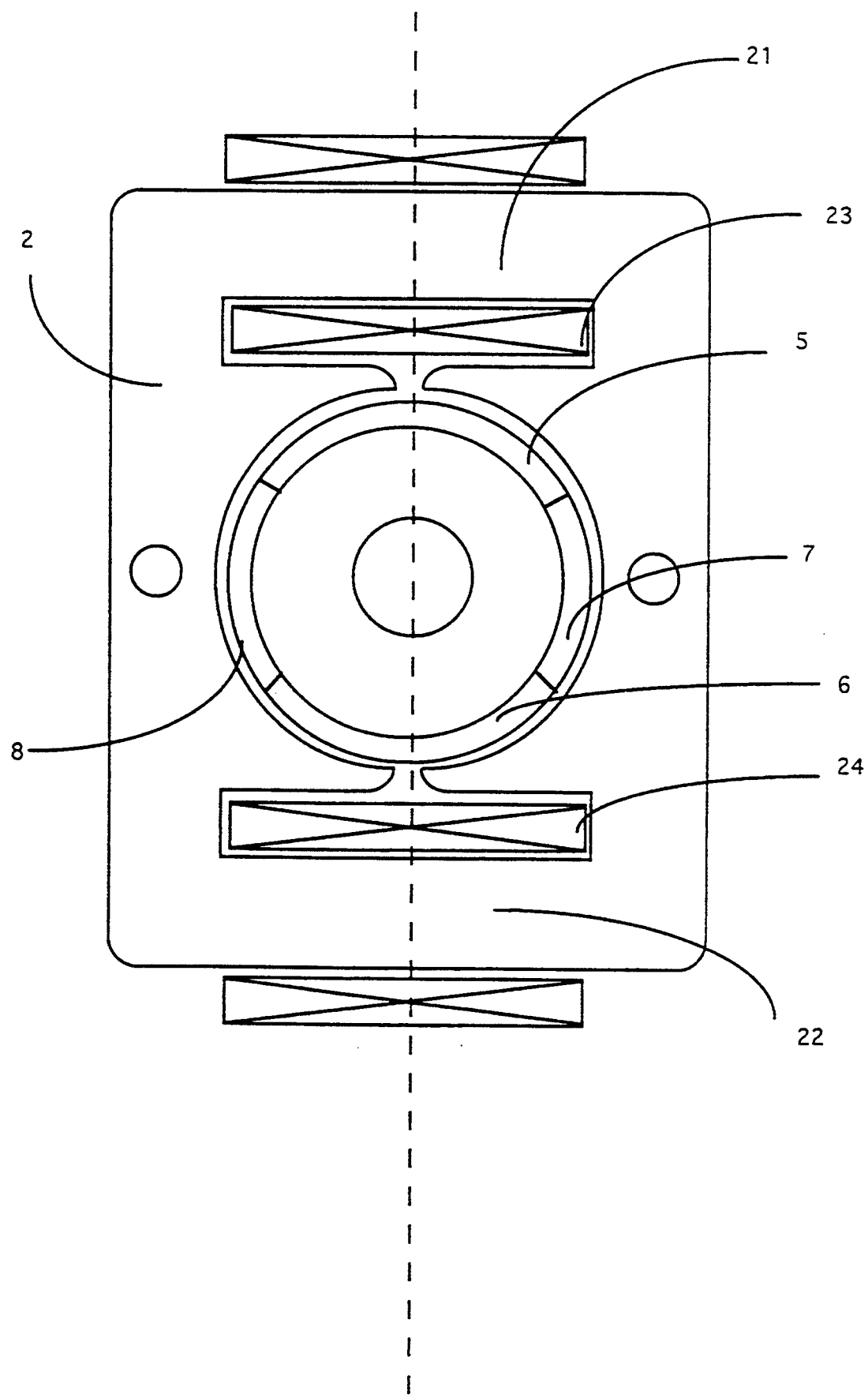
FIG. 4 represents a view in cross-section of a variant of an actuator having two coils.

FIG. 4 represents another embodiment in which stator 2 exhibits two connecting parts 21, 22. In this embodiment of FIG. 4, the actuator has two coils 23, 24. The rotor has, as in the example represented in FIG. 1, two magnets 5, 6 separated by cylindrical gaps 7 and 8.

Figure 5:
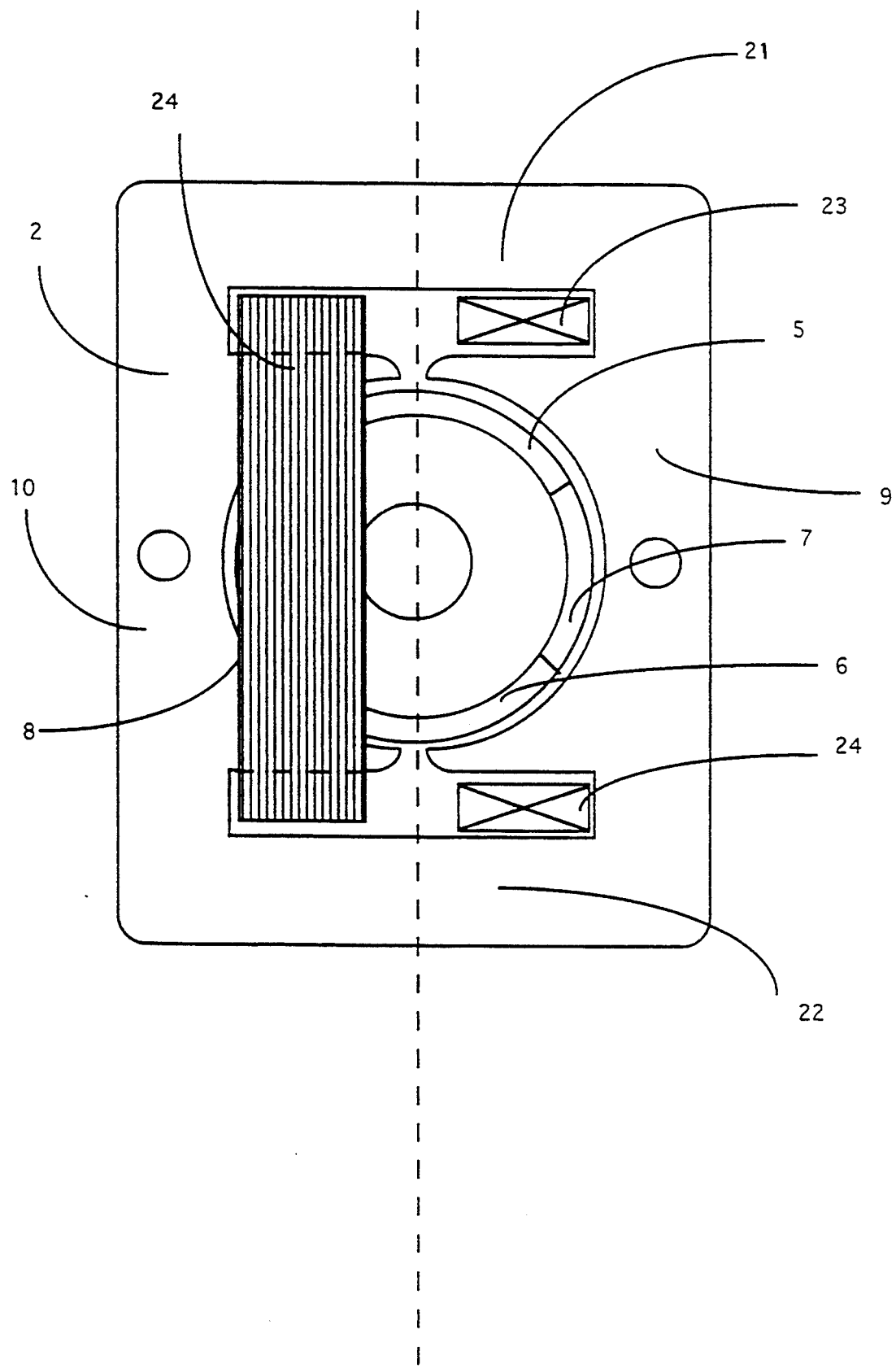
FIG. 5 represents a view in cross-section of a third embodiment of an actuator according to the present invention.

FIG. 5 represents a variant actuator according to the present invention having two coils 23 and 24 each respectively surrounding one of the stator poles 9 and 10.

Figure 6:
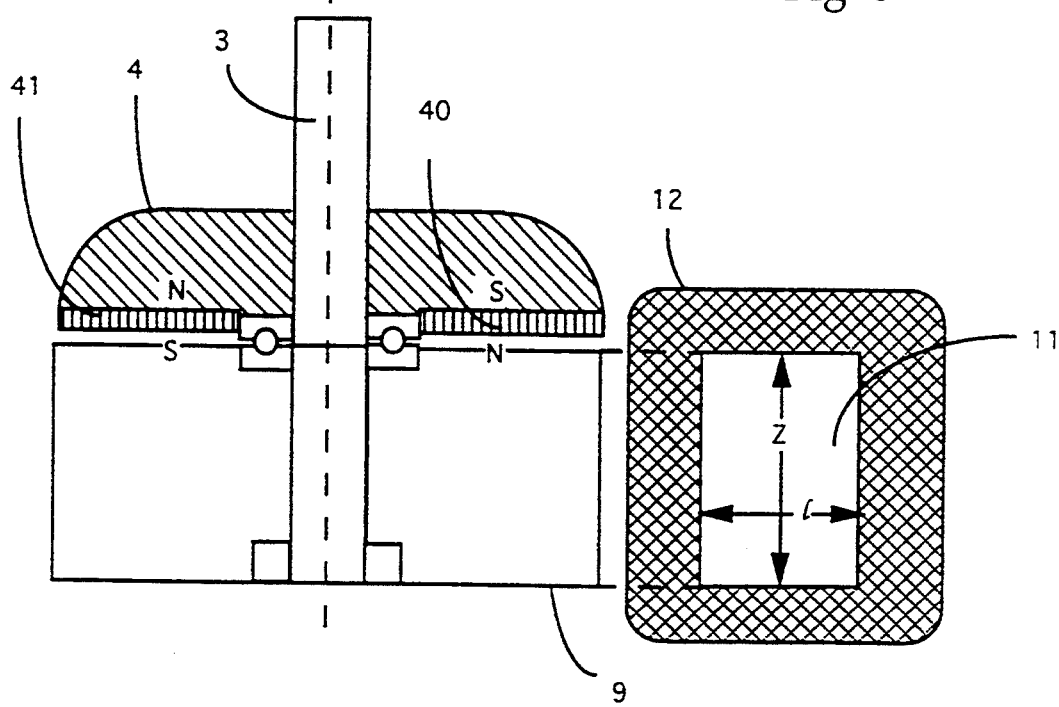
FIG. 6 represents a view in section of an actuator having a disk magnet.

FIG. 6 represents a view in section of an actuator having a disk-shaped magnet. This embodiment comprises a rotor 1 equipped with an axis of rotation 3, and with a stator having a stator connecting part 11 and two pole pieces 9 and 10. Connecting part 11 of the stator supports a coil 12.

Figure 7:
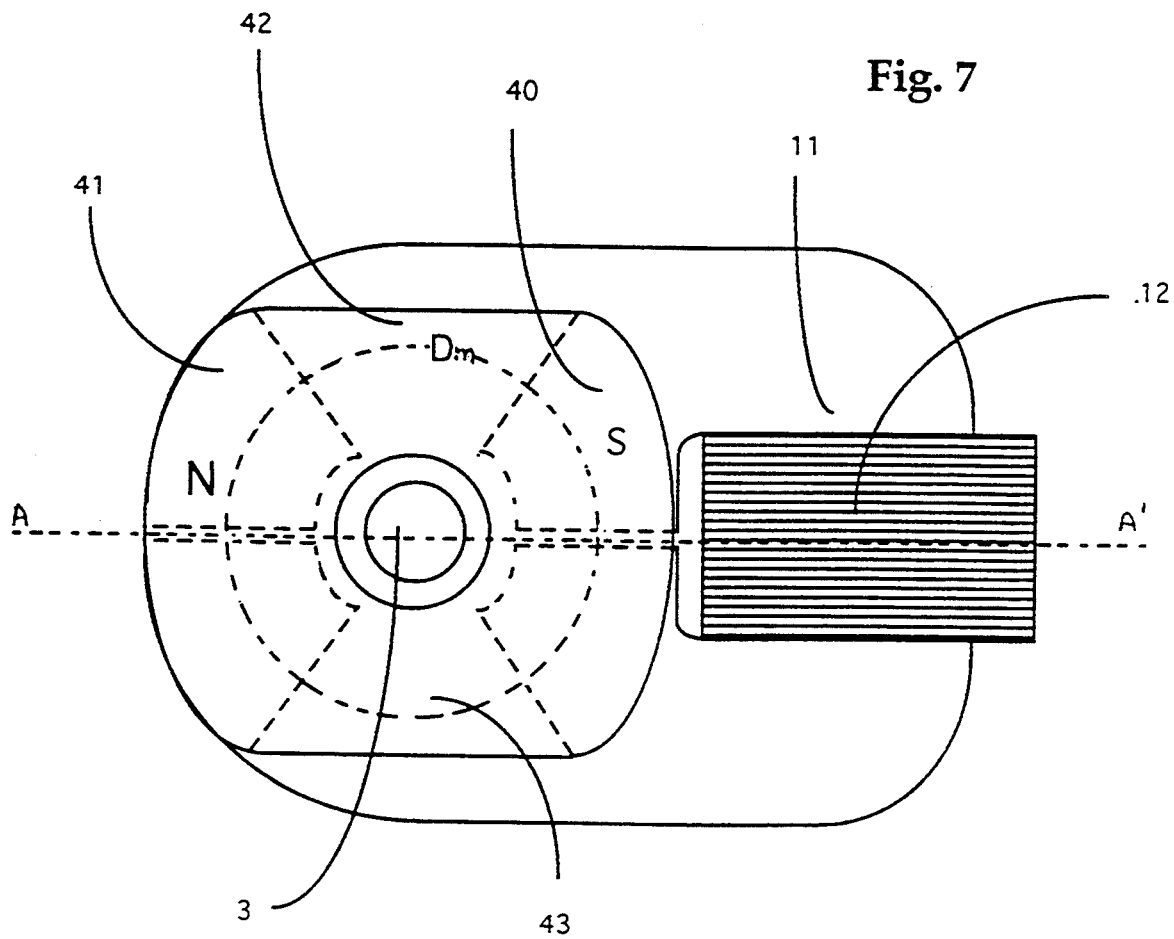
FIG. 7 represents a view of this same actuator along a plane of perpendicular section AA'.

FIG. 7 represents a view along a plane of section AA' of this actuator. The rotor has two magnets 40 and 41, magnetized transversely, and that extend over arcs between 80/N and 130/N degrees. Magnets 40 and 41 are integral with a core 4 of a material of high magnetic permeability. Magnets 40 and 41 are separated by gaps 42 and 43. The dimensions of the actuator according to the example of the embodiment are as follows:

height Z of stator connecting part 11: 17 millimeters;
thickness L of the magnet: 2.5 millimeters;
length E of the air gap: 3 millimeters;
mean diameter $D_m$ of the magnets: 35 millimeters;
angular travel of the rotor: 90 degrees;
travel of the rotor, measured on the mean diameter of the magnets: 27.5 millimeters;
arc $Y_a$ of magnets 40 and 41, measured on the mean diameter $D_m$ of the magnets: 37 millimeters.

Figure 8:
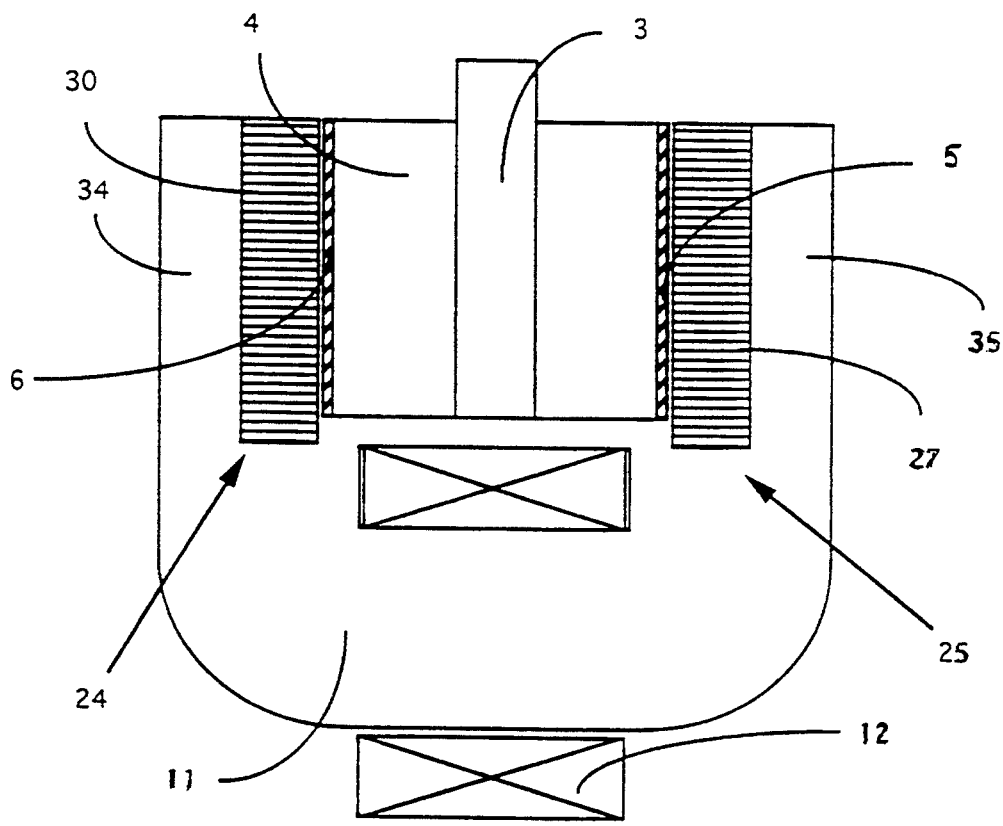
FIG. 8 represents a view in section of another embodiment of an actuator according to the present invention.

FIG. 8 represents a view in section of an actuator in which stator connecting part 11 is parallel to a plane containing the axis of rotation 3 of the rotor. Coil 12 is placed behind rotor 1. The rotor, as in the preceding examples, comprises a soft iron core 4 supporting radially magnetized semi-tubular magnets 5 and 6 in the shape of tiles.

Figure 9:
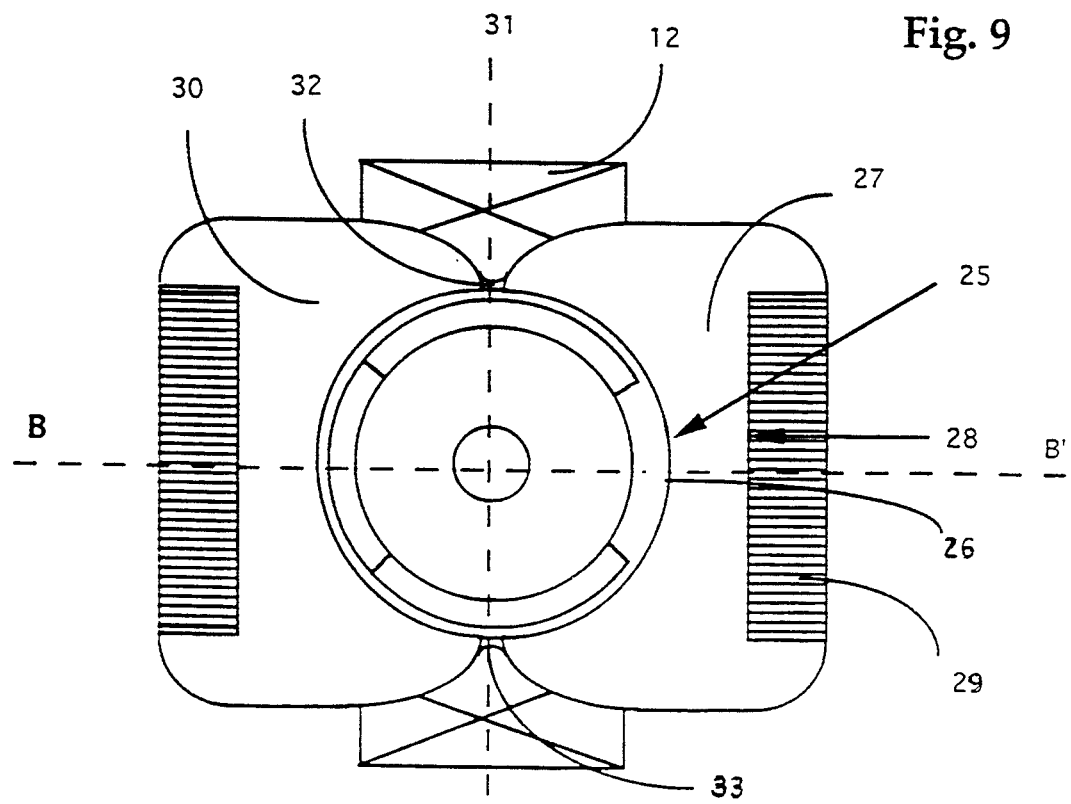
FIG. 9 represents a view of this same actuator along a plane of section BB'.

The stator is constituted by fitting two packets of perpendicular laminations. The first packet forming the stator poles comprises two series 23 and 24 of laminations 27 and 30 oriented perpendicularly to shaft 3 of the rotor. The shape of these laminations is more visible in FIG. 9, representing a top view of the actuator. The first series 23 of the packet of laminations perpendicular to shaft 3 exhibits an arc-shaped concave part 25, corresponding to the outside edges of air gap 26. The thickness of the lamination packet 27 and 30 measured in a direction parallel to the shaft of the rotor is approximately equal to Z. The outside part of laminations 27 and 30 exhibits a cutout 28 for the fitting of the second lamination packet 29. A second series of laminations 30 that is symmetrical in relation to a median plane 31 constitutes the second stator poles. To make possible a precise definition of the air gap, the first and the last lamination of the first packet 24 and 25 each have parts joined by two saturable isthmuses.

The second lamination packet 29 comprises laminations placed perpendicularly to the first lamination packet. The general shape of these laminations of the second packet is represented in FIG. 8. Each of the laminations exhibits a general U-shape, it has a connecting part 11 extended by two arms 34 and 35.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A monophase electromagnetic rotary actuator of angular travel between 70/N and 110/N degrees comprising:
   a rotor exhibiting 2N magnets, N being equal to 1 or to 2, and a core of a material of high magnetic permeability;
   a stator exhibiting two pole pieces joined by at least one connecting part supporting at least one coil, the two pole pieces and the core of the rotor defining between them an air gap of constant length E, wherein the 2N magnets have a reversible permeability close to 1 and wherein a relation between a magnetized width $Y_a$ of one of the 2N magnets measured on a mean diameter of the magnets, a width of an angular arc C through which the rotor passes on the mean diameter of the magnets, a width S measured on the mean diameter of the magnets between two adjacent stator poles and a constant length E of the air gap is $$Y_a = C + S + 2 E'$$

where:
   $E'$ is between $E/2$ and $E$
   and wherein:
   $C + 2 E'/E$ and wherein
   $L/E > 0.75$;

L designating a radial length of one of the 2N magnets;
   to obtain a high torque/mass ratio and a torque that is approximately independent of the angular position of the rotor.

2. The monophase electromagnetic rotary actuator according to claim 1, wherein the 2N magnets of the rotor comprise radially magnetized magnets in a shape of cylindrical tiles with the peripheral width $Y_a$ measured on the mean diameter $D_m$ of the magnets, wherein said 2N magnets extend over angular sections between 80/N degrees and 130/N degrees, and wherein the stator part has 2N pole pieces cooperating with the magnet, connected by a U-shaped connecting part.

3. The monophase electromagnetic rotary actuator according to claim 1, wherein the 2N magnets of the rotor comprise transversely magnetized magnets in a shape of disk sectors extending over angular sections between 80/N and 130/N degrees, and wherein the stator part has 2N pole pieces cooperating with the magnet, connected by a U-shaped connecting part.

4. The monophase electromagnetic rotary actuator according to either of claims 2 or 3, wherein a median section plane of the U-shaped connecting part is perpendicular to an axis of rotation of the rotor.

5. The monophase electromagnetic rotary actuator according to either of claims 2 or 3, wherein a median section plane of the U-shaped connecting part is parallel to a plane of symmetry of the pole pieces and contains an axis of rotation of the rotor.

6. The monophase electromagnetic rotary actuator according to any one of claims 1-3, wherein the stator part has two coils each surrounding one of the two pole pieces, said two pole pieces being joined by at least one connecting part.

7. The monophase electromagnetic rotary actuator according to any one of claims 2 or 3, wherein the two pole pieces of the stator are joined by two diametrically opposite connecting parts each carrying an excitation coil.

8. The monophase electromagnetic rotary actuator according to any one of claims 1-3, wherein the width S measured on the mean diameter $D_m$ of the magnets between two consecutive stator poles is between $E/2$ and E, and wherein the peripheral width $Y_a$ of the magnets measured on the mean diameter $D_m$ of the magnets is:

$$Y_a = C + 2 E' + S \approx C + 3 E',$$

and wherein the two magnets extend over arcs less than $180°/N$.

9. The monophase electromagnetic rotary actuator according to any one of claims 1-3, wherein a width $Y_s$ of a stator pole measured on the mean diameter $D_m$ of the magnets is equal to:

$$Y_s = C + 2 E' + T \approx C + 3 E',$$

where T designates a transition zone between two adjacent magnets of the rotor, T being less than E, and wherein the 2N magnets extend over arcs less than $180°/N$.

10. The monophase electromagnetic rotary actuator according to either of claims 2 or 3, wherein a section of the stator connecting part is approximately equal to $C \times Z$, where:
    Z designates a height of the magnets, measured according to a dimension perpendicular to their displacement and to their direction of magnetization.

11. The monophase electromagnetic rotary actuator according to either of claims 2 or 3, wherein the stator structure comprises two parallel lamination packets, said packets being assembled perpendicularly, the first of said lamination packets defining the stator pole pieces comprising laminations placed perpendicularly to the axis of rotation, the second lamination packet defining the U-shaped connecting part and comprising laminations parallel to a plane of symmetry of the stator passing through the middle of the stator poles and containing the axis of rotation of the rotor and passing through the stator poles, the laminations exhibiting cutouts for the relative fitting and positioning of said lamination packets.

12. The monophase electromagnetic rotary actuator according to claim 11, wherein the first lamination packet defining pole pieces comprises two series of pole laminations with a shape that is symmetrical in relation to the median plane of the actuator and has at each end a single lamination corresponding to said pole laminations joined by 2N saturable isthmuses.

* * * * *